United States Patent [19]

Watanabe

[11] Patent Number: 4,547,783
[45] Date of Patent: Oct. 15, 1985

[54] IMAGE FORMING APPARATUS

[75] Inventor: Junji Watanabe, Yokohama, Japan

[73] Assignee: Kabushiki Kaisha Toshiba, Kawasaki, Japan

[21] Appl. No.: 664,690

[22] Filed: Oct. 25, 1984

[30] Foreign Application Priority Data

Oct. 31, 1983 [JP] Japan ................................ 58-202642
Oct. 31, 1983 [JP] Japan ................................ 58-203812

[51] Int. Cl.$^4$ .............................................. B41J 3/20
[52] U.S. Cl. ................................. 346/76 PH; 400/120
[58] Field of Search ................. 400/120, 224.1, 224.2, 400/614, 614.1, 240, 240.3; 346/76 R, 76 PH, 136, 204; 219/216 PH; 101/115, 135, 138, DIG. 1

[56] References Cited

FOREIGN PATENT DOCUMENTS

| 57-22142 | 8/1983 | Japan | 400/224.1 |
| 2100673 | 6/1983 | United Kingdom | 346/76 PH |
| 2117708 | 10/1983 | United Kingdom | 400/224.2 |

Primary Examiner—Thomas H. Tarcza
Assistant Examiner—A. Evans
Attorney, Agent, or Firm—Cushman, Darby & Cushman

[57] ABSTRACT

An image forming apparatus for forming an image on a sheet by transferring a color medium from a transfer medium to the sheet in a transfer position in accordance with an image pattern comprises a recording head, a platen, and a pair of pressure rollers for pressing the sheet against the platen. A pair of separating rollers for separating the transfer medium from the sheet are arranged between the transfer position and their corresponding pressure rollers. The platen is coupled to a conveyance control mechanisms for reciprocating the sheet in the transfer position. In operation, the sheet is fed in the forward direction, the color medium of the transfer medium is transferred to the sheet in the transfer position, and then the transfer medium and the sheet are separated by the one separating roller. After the color medium is transferred to the trailing end portion of the sheet, the sheet is fed in the backward direction, and the transfer medium and the trailing end portion of the sheet are separated by the other separating roller.

11 Claims, 31 Drawing Figures

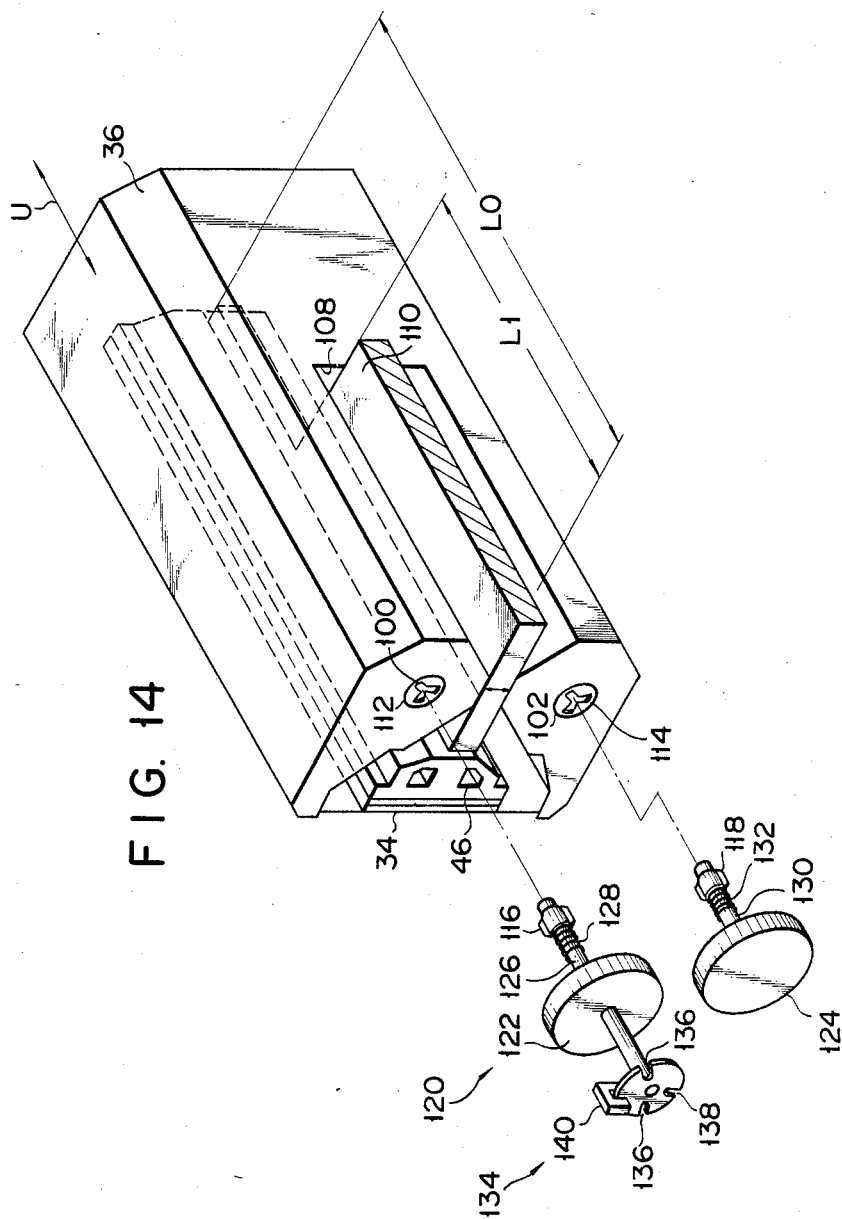

F I G. 18
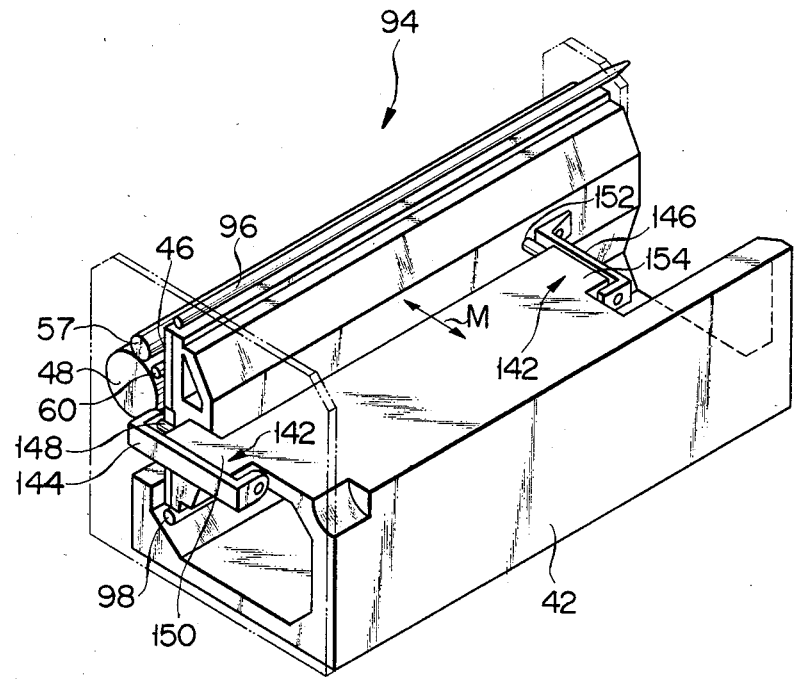
F I G. 19
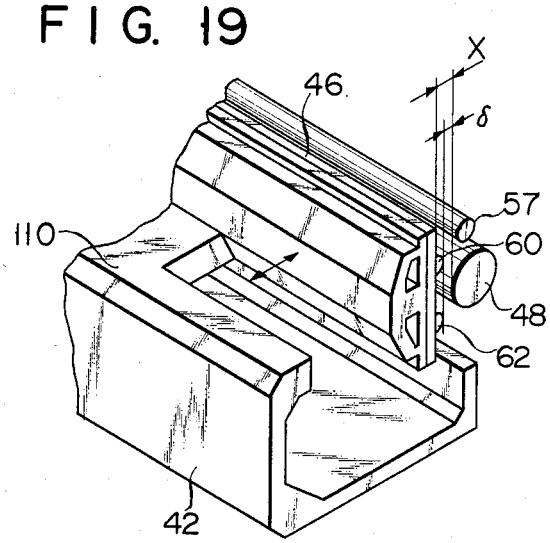

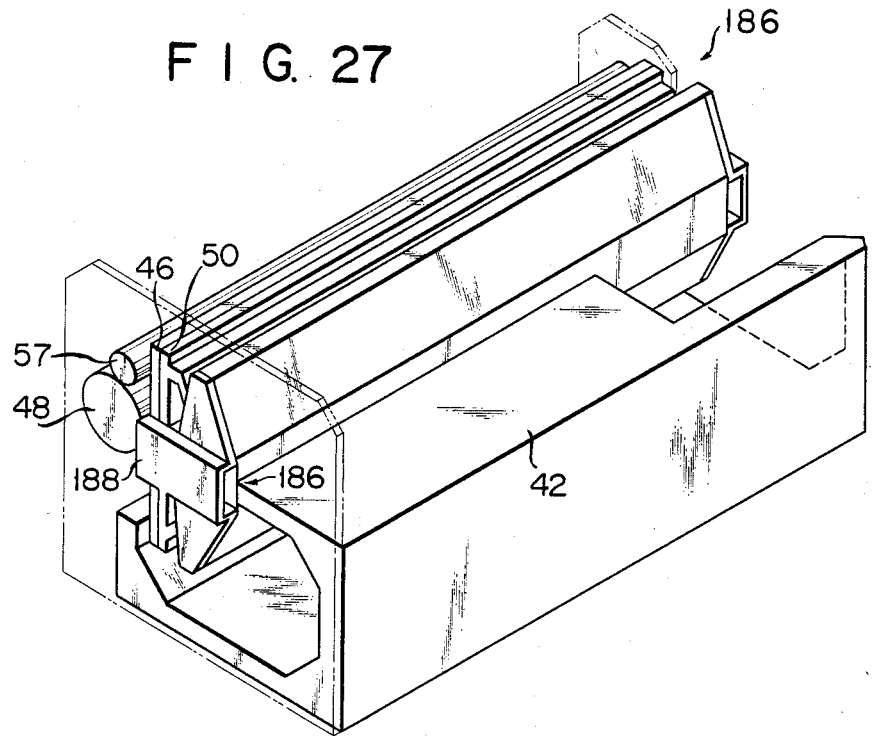
FIG. 27
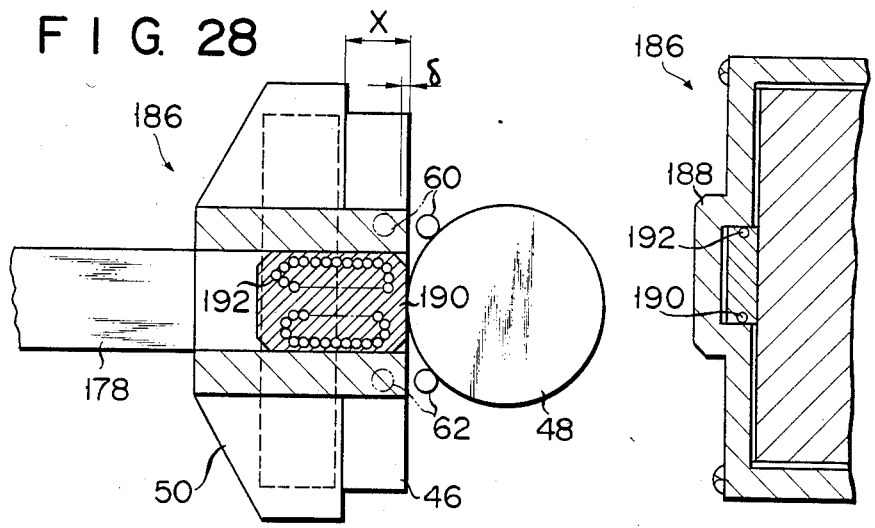
FIG. 28
FIG. 29

IMAGE FORMING APPARATUS

BACKGROUND OF THE INVENTION

The present invention relates to an image forming apparatus for forming an image by transferring a color medium from a transfer medium to a sheet in accordance with an image pattern and, more specifically, to an image forming apparatus in which a sheet is reciprocated in a transfer position, and the color media of several colors are transferred in layers onto the sheet, thereby forming a color image thereon.

Among conventional color image forming apparatuses of this type are thermal head printers in which color media are melted by heat in accordance with an image pattern and transferred to a sheet.

Generally, small-sized, low-priced, noise-free, and capable of printing on ordinary paper, these thermal head printers have recently been used as output devices of computers and word processors, and in copying apparatuses.

In one such prior art thermal head printer 1, as shown in FIGS. 1 and 2, a recording head 3 is opposed to a platen 2, and, in the transfer operation, a sheet 4 and a ribbon (transfer medium) 5 are interposed between the platen 2 and the recording head 3. Pressure rollers (pressure means) 6 and 7 are arranged on either side of a transfer position R along the sheet conveying direction, whereby the sheet 4 is pressed against the platen 2 so as to be securely held between the platen 2 and the pressure rollers 6 and 7. A guide roller 8 and a separating roller (separating means) 9 are arranged between the transfer position R and the pressure rollers 6 and 7, respectively. The guide roller 8 serves to guide the ribbon 5 so that the ribbon 5 is joined with the sheet 4 in the transfer position R, while the separating roller 9 serves to guide the ribbon 5 so that the ribbon 5 is separated from the sheet 4 after the transfer operation. In the transfer operation, the sheet 4, along with the ribbon 5, is conveyed through the transfer position R as the platen 2 rotates in the direction indicated by arrow D. During the transfer, the sheet 4 and the ribbon 5 are normally brought into close contact with each other by the guide roller 8, so they are separated by the separating roller 9 after passing through the transfer position R.

In forming a color image, however, the platen 2 needs to be rotated in the reverse direction (opposite to the direction of arrow D) to rewind the sheet 4 in order to transfer a second color top of a first color after the first color is transferred to the sheet 4. It is therefore necessary that the trailing end portion of the sheet 4 be held between the platen 2 and the pressure roller 6, as shown in FIG. 2. In this state, moreover, those portions of the sheet 4 and the ribbon 5 which have undergone the transfer operation are expected to have already been separated from each other by the separating roller 9. In consequence, as shown in FIG. 2, a nontransfer region or blank (corresponding to angle $l_0$) is formed between that portion G of the sheet 4 located between the platen 2 and the separating roller 9 and that portion H of the sheet 4 between the platen 2 and the pressure roller 6.

Thus, the prior art image forming apparatus is subject to a drawback such that the nontransfer region (imageless region) of the sheet with the image thereon is wide, that is, the image forming region is narrow.

SUMMARY OF THE INVENTION

The object of the present invention is to provide an image forming apparatus affording a wider image forming region of a sheet.

According to an aspect of the present invention, there is provided an image forming apparatus for forming an image on a sheet by transferring, in a transfer position and in accordance with an image pattern, a color medium from a transfer medium to fully cover the length of a sheet. The image forming apparatus comprises: a recording head for transferring the color medium from the transfer medium to the sheet in accordance with the image pattern; a platen opposed to the recording head and supporting the sheet in the transfer position; a pair of pressure means for pressing the sheet against the platen on either side of the transfer position, thereby holding the sheet in conjunction with the platen; a pair of separating means located individually between the transfer position and the pair of pressure means and adapted to separate the transfer medium from the sheet; and a conveyance control means for controlling conveyance of the sheet between the recording head and the platen for reciprocation in the transfer position. The conveying means is adapted to convey the sheet, with the leading end portion thereof forward, in the forward direction through the transfer position at the time of transfer, so that the transfer medium is separated by one separating means from the sheet with the color medium transferred thereto from the transfer medium in the transfer position. The conveyance control means further conveys the sheet in the backward direction after the color medium is transferred to the trailing end portion of the sheet, so that the transfer medium is separated from the transfer-printed trailing end portion of the sheet by the other separating means.

BRIEF DESCRIPTION OF THE DRAWINGS

FIG. 14 is a perspective view showing the way a ribbon cassette is mounted on a winding mechanism of a ribbon cassette mounting section;

FIG. 18 is a perspective view of the transfer unit shown in FIG. 5;

FIG. 19 is a perspective view showing part of the transfer unit of FIG. 18;

FIG. 27 is a perspective view of a transfer unit having a modified head sliding mechanism;

FIG. 28 is a side sectional view showing part of the transfer unit of FIG. 26;

FIG. 29 is a front sectional view showing part of the transfer unit of FIG. 26.

DETAILED DESCRIPTION OF THE PREFERRED EMBODIMENT

A preferred embodiment of the present invention will be described with reference to FIGS. 3 to 31.

Figure 1:
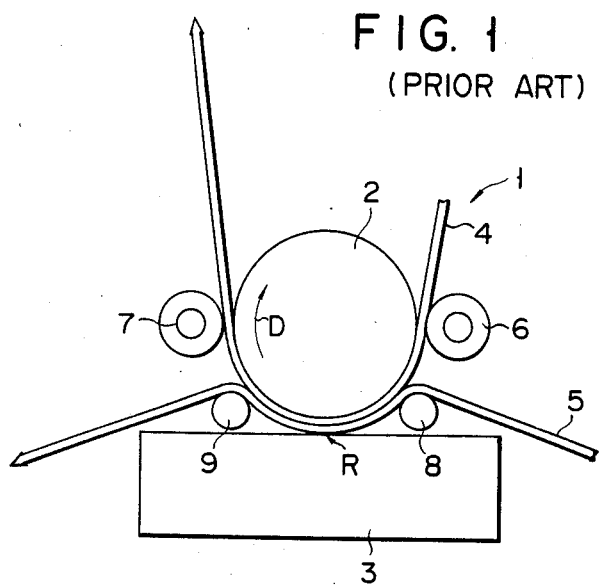
FIGS. 1 and 2 are side views schematically showing the construction of a prior art thermal head printer for illustrating its drawbacks.
Figure 2:
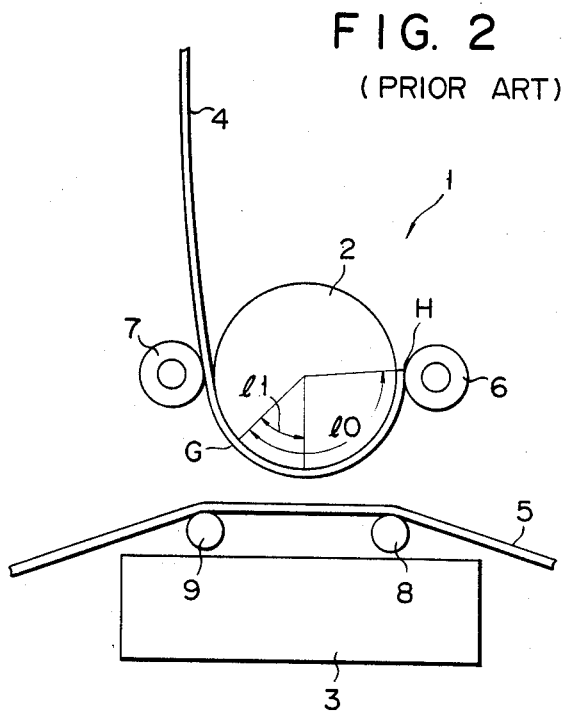
Figure 3:
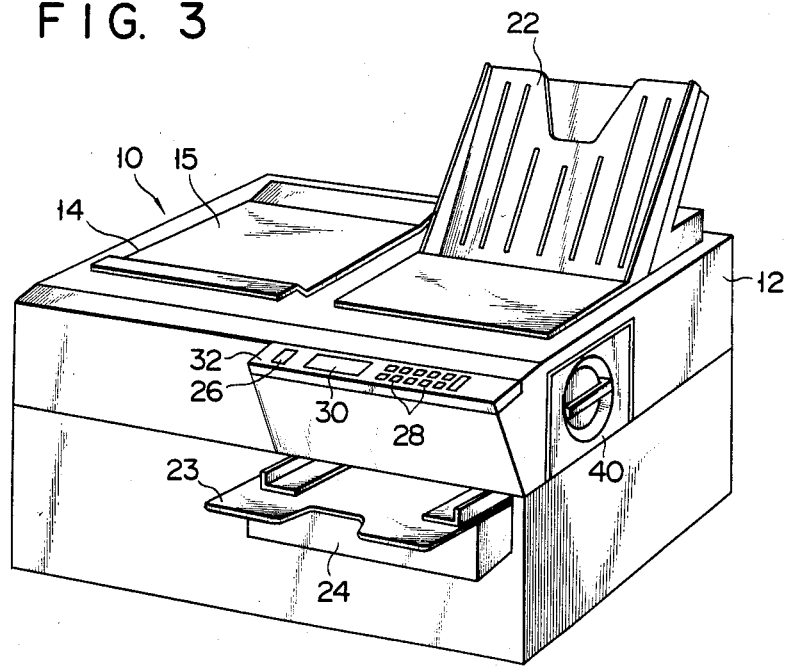
FIG. 3 is a schematic, perspective view of a thermal head printer (image forming apparatus) according to an embodiment of the present invention.
Figure 4:
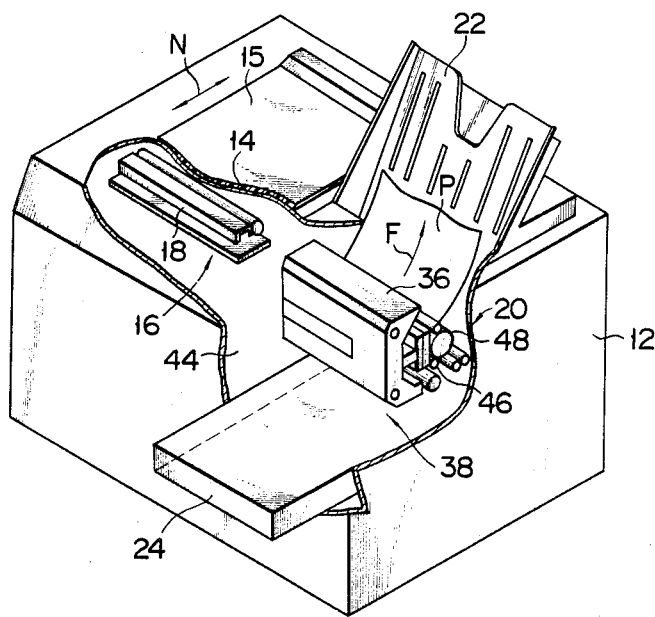
FIG. 4 is a cutaway, schematic, perspective view of the thermal head printer shown in FIG. 3.

As shown in FIGS. 3 and 4, in a copying apparatus (thermal transfer printing apparatus) 10 having a thermal transfer function according to an embodiment of the present invention, a document tale 14 (shown in FIG. 4) is formed at the upper surface of a housing 12 so as to support a document to be copied. The document table 14 comprises a transparent member such as a glass member. A cover 15 is mounted on the document table 14 so as to cover the document placed on the document table 14. A scanning section 16 is arranged below the document table 14 to scan the document placed on the document table 14. The scanning section 16 has an exposure optical system 18 which is movable along the direction indicated by arrow N so as to expose the document. The scanning section 16 also has an photoelectric function which allows the optical information to be photoelectrically converted an electrical signal. An image forming section 20 (to be described in detail later) is arranged substantially at the center of the housing 12 to form an image on a recording sheet or paper sheet P in response to the electrical signal from the scanning section 16.

A discharge tray 22 is mounted to extend upward from the housing and to receive along the direction indicated by arrow F the paper sheets P which have had their images transferred at the image forming section 20. A paper feed cassette 24 is detachably mounted at the front wall of the housing 12 so as to supply paper sheets P to the image forming section 20. A manual feed guide 23 is also detachably mounted above the paper feed cassette 24 so as to allow the operator to manually feed sheets one by one. An operation panel 32 having a start button 26, numeral keys 28 marked with 0 to 9, and a display panel 30 for displaying operation information such as "paper jam" is arranged on the upper front portion of the housing 12.

Inside the housing 12, the image forming unit 20 adjoins a ribbon cassette holding section 38 having a holder 42 which holds a ribbon cassette 36 housing a ribbon (transfer member) 34. The cassette holding section 38 is provided with a door 40 which can be opened and closed when setting the ribbon cassette 36 on the holder 42.

The image forming unit 20 is provided with a thermal head 46 formed of dots for heating that portion of the ribbon 34 which is exposed from the ribbon cassette 36 for color medium or ink transfer. The dots of the thermal head 46 is heated in accordance with the pattern signal from the scanning unit 16, and melts a color agent applied to the ribbon 34 to transfer it to the sheet. A platen 48 for pressing the ribbon 34 and the sheet P against the thermal head 46 faces the thermal head 46 with the ribbon 34 between them. A radiating board 50 for radiating heat generated from the thermal head 46 is disposed at the back (on the sheet cassette side) of the thermal head 46.

Figure 5:
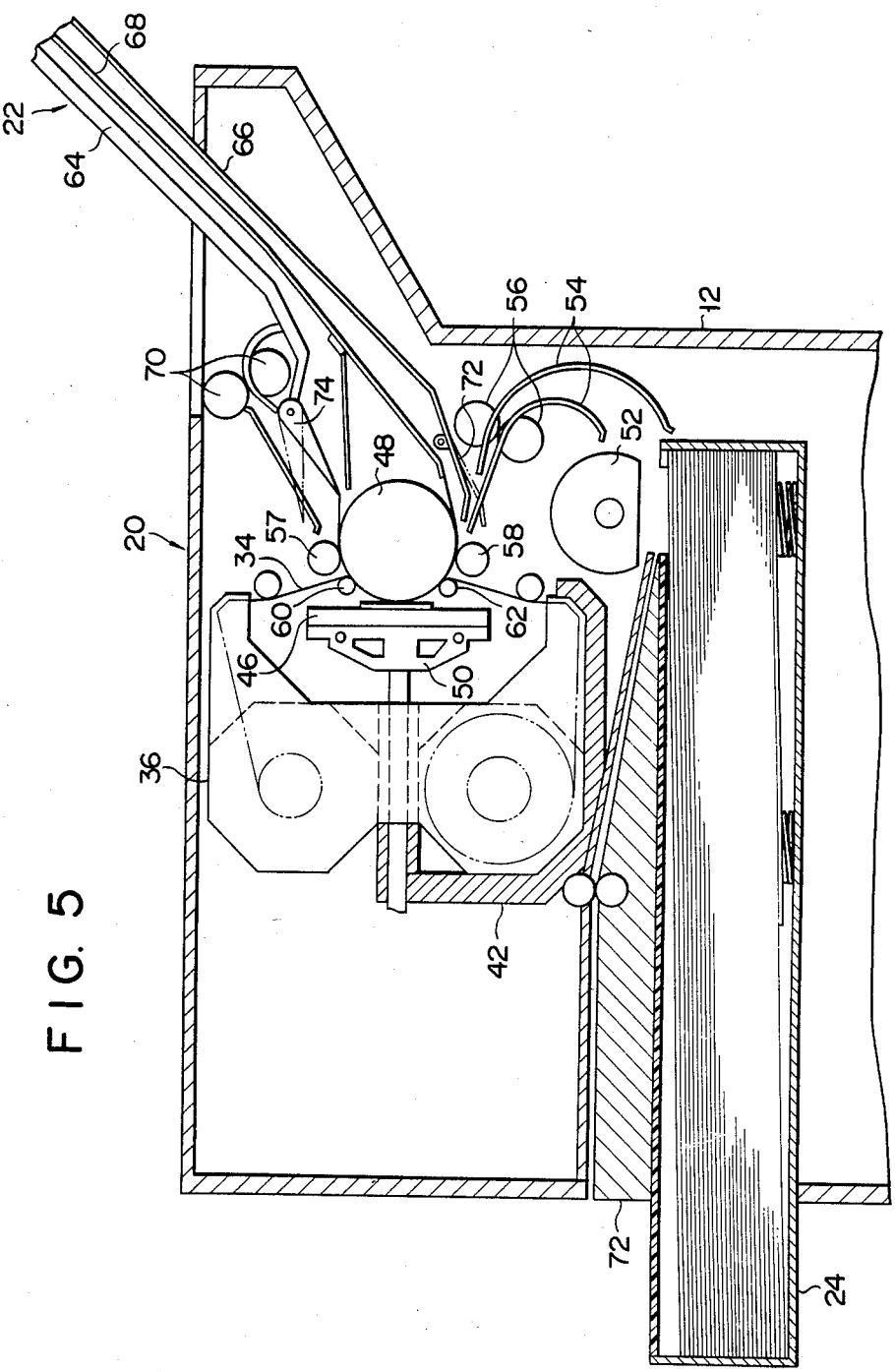
FIG. 5 is a schematic, longitudinal, sectional view of the thermal head printer shown in FIG. 3.

The image forming section 20 will be described in detail with reference to FIG. 5. A sheet-feeding roller 52 is disposed above the front portion of the paper feed cassette 24 to feed the paper sheet P to the transfer position. A pair of guide plates 54 is disposed in the vicinity of the sheet-feeding roller 52 to guide the picked-up sheet P. A pair of resist rollers 56 is also disposed in the vicinity of the distal ends of the guide plates 54 to align the leading end of the paper sheet P with a reference point. First and second pressure rollers (pressing means) 57 and 58 are vertically disposed to be brought into tight contact with or separated from the plate 48 so as to urge the paper sheet P conveyed from the resist rollers 56 against the platen 48 and to guide the paper sheet P to the transfer position. A pair of separating or guide rollers 60, 62 for separating and guiding the ribbon 34 to the sheet P are disposed between the thermal head 46 and the first and second pressure rollers 57, 58, respectively. The guide rollers 60, 62 are described later.

A discharge plate 64 for discharging the image-transferred paper sheets P and first and second guide plates 66 and 68 for temporarily holding the sheets P are integrally formed to constitute the discharge tray 22 in the vicinity of the image forming section 20. In addition, a pair of discharge rollers 70 is disposed at the distal end of the discharge plate 64 to discharge the image-transferred paper sheet P from the image forming section 20 to the discharge plate 64. It should be noted that the discharge tray 22 and the discharge rollers 66 are integrally formed, and the resultant assembly can be detachably mounted in the housing 12.

A first selector guide 72 is pivotally mounted at the distal end of the first guide plate 66 between the resist rollers 56 and the platen 48 to select the conveying direction of the sheet P when an images is formed on the paper sheet P. The first selector guide 72 guides the paper sheet P from the resist rollers 56 to the platen 48 and from the platen 48 to the first guide plate 66. A second selector guide 74 is pivotally disposed at the distal end of the second guide plate 68 between the discharge rollers 70 and the platen 48 so as to guide the paper sheet P toward the support plate 64 and toward the second guide plate 68.

Figure 6:
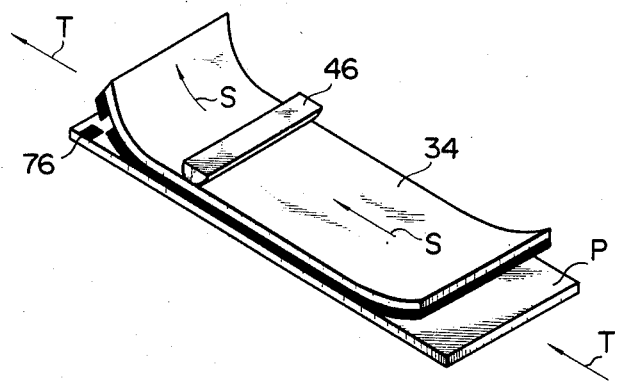
FIG. 6 is a perspective view for illustrating the transfer operation of the thermal head printer shown in FIG. 3.

The thermal transfer printing mechanism which uses a thermal head 46 is shown in FIG. 6. Ink 76 coated on the ribbon 34 is melted by heat generated from the thermal head 46 and is transferred to the paper sheet P.

Figure 7:
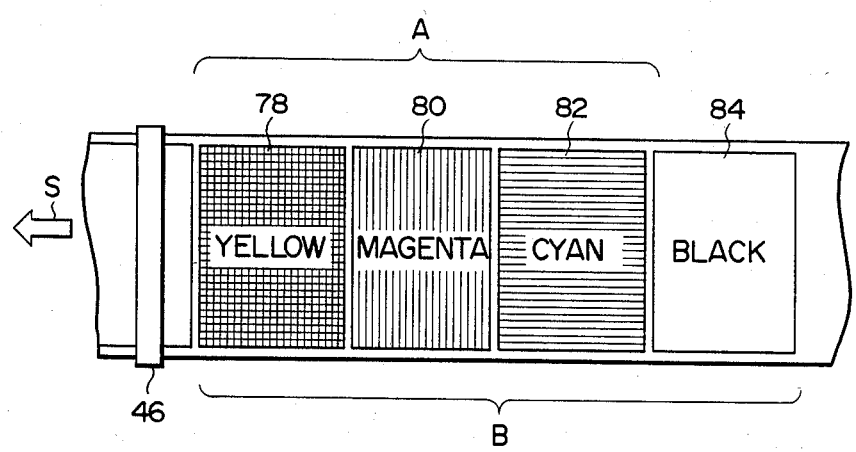
FIG. 7 is a plan view showing the way a ribbon used in the thermal head printer of FIG. 3 is coated with ink.

During thermal transfer printing, the ribbon 34 and the paper sheet P are simultaneously shifted in the direction indicated by arrows S and T. As shown in FIG. 7, the ribbon 34 in one ribbon cassette 36 has an area A having a yellow portion 78, a magenta portion 80 and a cyan portion 82, or an area B consisting of the area A and, in addition, a black portion 84. When the thermal transfer operation is performed, a first color ink is transferred to the paper sheet P, and then the next color ink is transferred thereto. This operation is repeated to transfer a full color image. In general, three color components in the area A and mixed to reproduce a black image. However, when the black image portion is to be emphasized, a four-color ribbon having the area B is used.

The transfer operation of the image forming section 20 in full color transfer will be described with reference to FIGS. 8 to 11.

Figure 8:
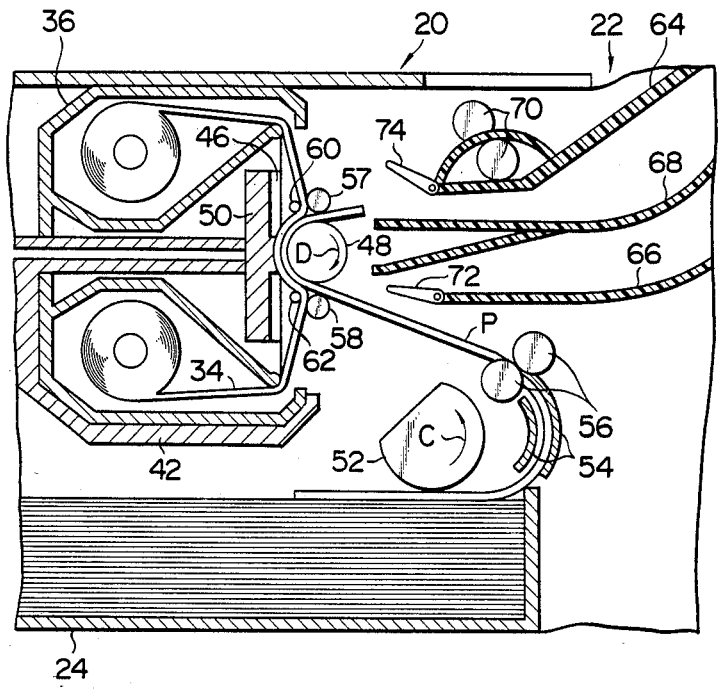
FIGS. 8 to 11 are sectional views for illustrating an outline of the transfer operation of the thermal head printer shown in FIG. 3.

As shown in FIG. 8, when the sheet-feeding roller 52 is rotated in a direction indicated by arrow C, the paper sheet P is picked up from the paper feed cassette 24. The picked-up sheet P is guided by the guide plates 54 to the resist rollers 56. The leading end of the paper sheet P is aligned by the resist rollers 56. The paper sheet P is further conveyed by the resist rollers 56 until it reaches the platen 48. Since the platen 48 is rotated in the direction indicated by arrow D (clockwise), the paper sheet P is fed along the platen 48 until it is opposite the thermal head 46 through the ribbon 34. The thermal head 46 then transfers an image on the paper sheet P in response to a signal from the exposure optical system in such a manner that the first ink of the ribbon 34 is melted and transferred to the sheet P.

Figure 9:
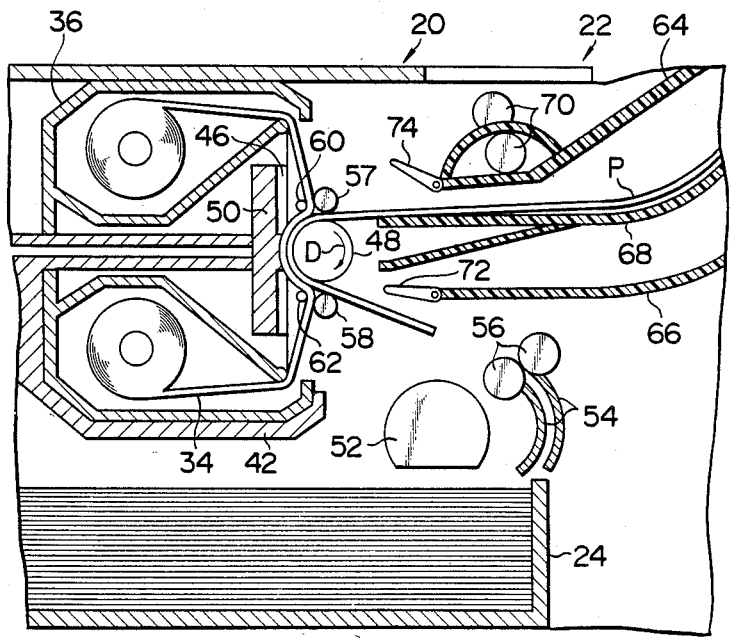
Figure 10:
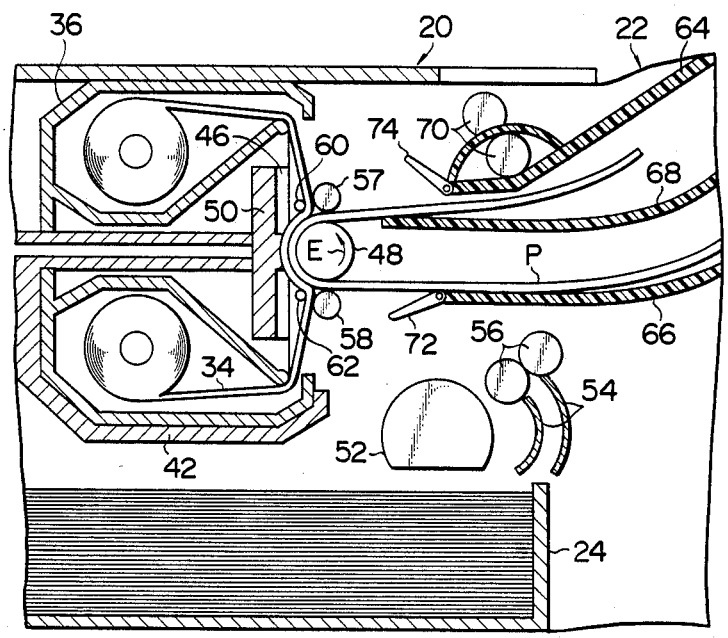

As shown in FIG. 9, the second selector guide 74 is substantially parallel to the second guide plate 68 and guides, and temporarily locates the paper sheet P on the second guide plate 68 after the ink has once been transferred onto the paper sheet P by the thermal head (i.e., after the first color has been transferred onto the sheet). As shown in FIG. 10, the first selector guide 72 is pivoted downward after the paper sheet P passes therethrough.

The paper sheet P onto which the first color has been transferred is shifted from the second guide plate 68 to the first guide plate 66, as shown in FIG. 10. In other words, the paper sheet P must be temporarily fed back for a second color transfer. For this purpose, the paper sheet P is fed back along the first guide plate 66. The platen 48 is rotated counterclockwise (i.e., in the direction indicated by arrow E), and the paper sheet P is fed along the first guide plate 66. Since the first selector guide 72 is held at the lower position, the paper sheet P can be smoothly fed onto the first guide plate 66.

Figure 11:
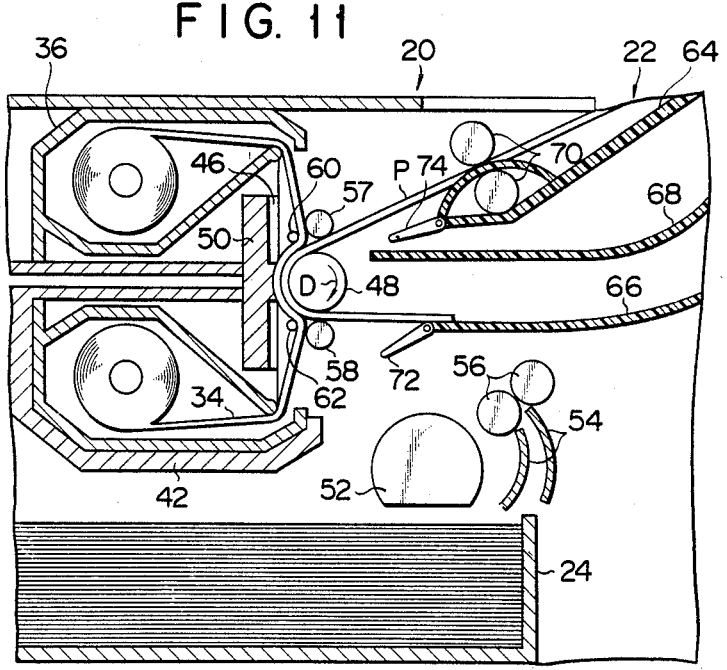

When the paper sheet P is completely moved on the guide plate 66, the platen 48 is rotated again in the direction indicated by arrow D, as shown in FIG. 11, and the paper sheet P is subjected to a second color transfer. In this manner, the second, third and fourth color inks are transferred to the paper sheet P. Thereafter, the second selector guide 74 is kept at the upper pivot position so as to discharge the paper sheet P onto the discharge plate 64. The paper sheet P having a full color image is then discharged onto the discharge plate 64.

Figure 12:
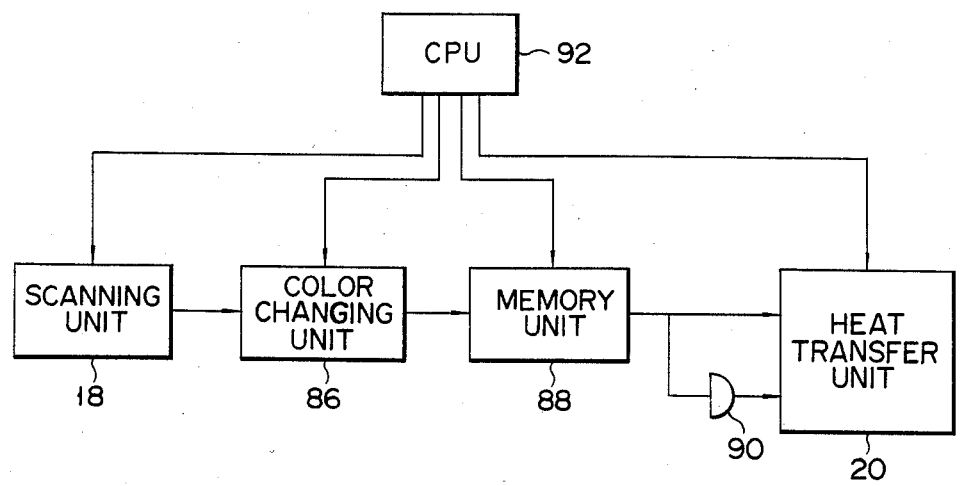
FIG. 12 is a block diagram showing the configuration of the principal part of the thermal head printer shown in FIG. 3.
Figure 15:
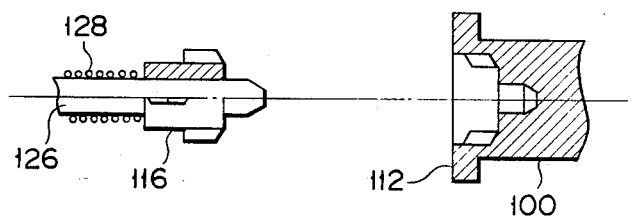
FIG. 15 is a sectional view showing part of the winding mechanism and a driving force receiving end portion of a roll shaft shown in FIG. 14.

The control system or controlling the thermal transfer printer 10 will be described with reference to FIG. 12. A color changing unit 86 and a memory unit 88 are arranged between the scanning unit 18 and the heat transfer unit (image forming unit) 20. The color changing unit 86 is connected to the scanning unit 18. Color component signals (i.e., green, yellow, cyan and black color signals) detected by the scanning unit 18 are converted so as to correspond to the color mediums or inks (i.e., magenta, yellow, cyan and black) coated on the ribbon. The color changing unit 86 is connected to the memory unit 88. The memory unit 88 stores position data on the document in association with the respective colors. The memory unit 88 is connected to the heat transfer unit (image forming unit) 20. The heat transfer unit (image forming unit) 20 transfer the respective inks in accordance with the color data and position data which are read out from the memory unit 88, thereby forming an image on the sheet P. An AND gate 90 is inserted between the heat transfer unit (image forming unit) 20 and the memory unit 88 so as to generate a black signal by gating the magenta, yellow and cyan signals.

The scanning unit 18, the color changing unit 86, the memory unit 88 and the heat transfer unit 20 are commonly connected to a CPU (central processing unit) 92 which then controls the signal generation timings of the respective units and the operations thereof.

In this embodiment, the holder 42, the platen 48, the thermal head 46, the pair of guide rollers or separating rollers 60, 62, and the pressure rollers 57, 58 constitute a single unit as a holder unit 94.

The holder unit 94 will be described with reference to FIGS. 13 to 19.

The holder 42 is made of a die cast or plastic and has a substantially C-shaped section. Therefore, the holder 42 has sufficient strength. When the ribbon cassette 36 is mounted in the holder 42, the holder 42 holds the ribbon cassette 36 so as to surround part of the ribbon cassette 36, thereby allowing highly precise alignment. In addition, when the ribbon cassette 36 is held in the holder 42, two cassette support members 96 and 98 are disposed in the vicinity of an exposed portion of the ribbon 34 so as to support the inner wall of the cassette. The cassette support members 96 and 98 extend from the upper and lower portions of the holder unit 94 so as to be substantially parallel to the axis of the platen. Case portions of the ribbon cassette 36 which are located near the exposed portions of the ribbon 34 have an elongated shape which is thinner than that corresponding to reels 100 and 102. These case portions are thus mechanically weak. In this embodiment, when the ribbon cassette is mounted in the holder, the support members 96 and 98 support these case portions adjacent to the exposed portions, thereby firmly holding the ribbon cassette. In addition, the support member 96 and 98 support the movement of the ribbon cassette when the ribbon cassette is mounted in the holder 42. A support portion 104 is formed between the cassette support member 96 and 98 in the holder 42 to support and guide the thermal head 46. The thermal head 46 is coupled to a head movement mechanism (to be described later with reference to FIG. 21) and is movable between the transfer position indicated by the solid line in FIG. 13 and the nontransfer position indicated by the dotted line in FIG. 13.

The ribbon cassette 36 has the reels 100 and 102 on which one end portion and the other end portion of the ribbon 34 are wound, respectively. The reels 100 and 102 are surrounded by a case 106, with parts of the reels 100 and 102 exposed.

As shown in FIG. 14, a slit 108 is formed in the case 106 of the ribbon cassette 36 used in this embodiment. The slit 108 is designed so that a frame block 110 (part of the holder 42) is fitted in the space between the reels 100 and 102, which extend parallel to each other, to be wound with the ribbon 34. If the width of the case 106 and the length of the slit 108 are $L_0$ and $L_1$ (FIG. 14), respectively, it is to be desired that there is a relation of $L_1 > \frac{1}{2} L_0$. In this embodiment, $L_1 = \frac{2}{3} L_0$ is used, so that two thirds of the length of the ribbon cassette 36 is supported in its central portion. Thus, the ribbon cassette 36 is securely supported by the frame block 110.

The width t of the slit 108 is substantially equal to the thickness of the frame block 110. Accordingly, the ribbon cassette 36 can be accurately and securely held in position when mounted on the holder 42. In FIG. 14, numerals 112 and 114 designate notches which are formed at one end portion of the reels 100 and 102, respectively, to engage couplings 116 and 118 (mentioned later). Arrow U indicates the direction in which the ribbon cassette 36 is attached to or detached from the holder 42.

Referring now to FIGS. 13 to 17, a winding mechanism 120 for winding the ribbon 34 on the reels 100 and 102 will be described. The winding mechanism 120 includes first and second pulse motors 122 and 124 for driving the reels 100 and 102, respectively. The coupling 116 is mounted on one end portion of a shaft 126 of the first pulse motor 122 so as to be slidable along the axis of the shaft 126. A spring 128 for urging the coupling 116 toward the notch 112 is fitted on one end portion of the shaft 126, whereby the coupling 116 and the notch 112 of the reel 100 are securely engaged. Likewise, the second pulse motor 124 is provided with a shaft 130 and a spring 132. The shaft 126 of the first pulse motor 122 is further fitted at the other end thereof with a roll diameter detecting mechanism 134 which detects the roll diameter of the ribbon 34 on the reel 100 and delivers a detection signal.

The roll diameter detecting mechanism 134 comprises a disk 138 fixed to the other end portion of the shaft 126 and having a plurality of slits 136 (e.g., four in number) and a detector 140 nipping the disk 138. The detector 140 optically senses the passage of the slits 136 to detect the rotating speed of the disk 138 or the reel 100, and calculates the ribbon roll diameter in accordance with the detected rotating speed. Then the detector 140 delivers a display signal representing the quantity of the unused portion of the ribbon, or residual quantity, to the operation panel 32. In response to the display signal from the detector 140, the operation panel 32 causes the display panel 30 to indicate the residual quantity.

A method for calculating the ribbon roll diameter from the rotating speed of the reel 100 will now be described.

Figure 13:
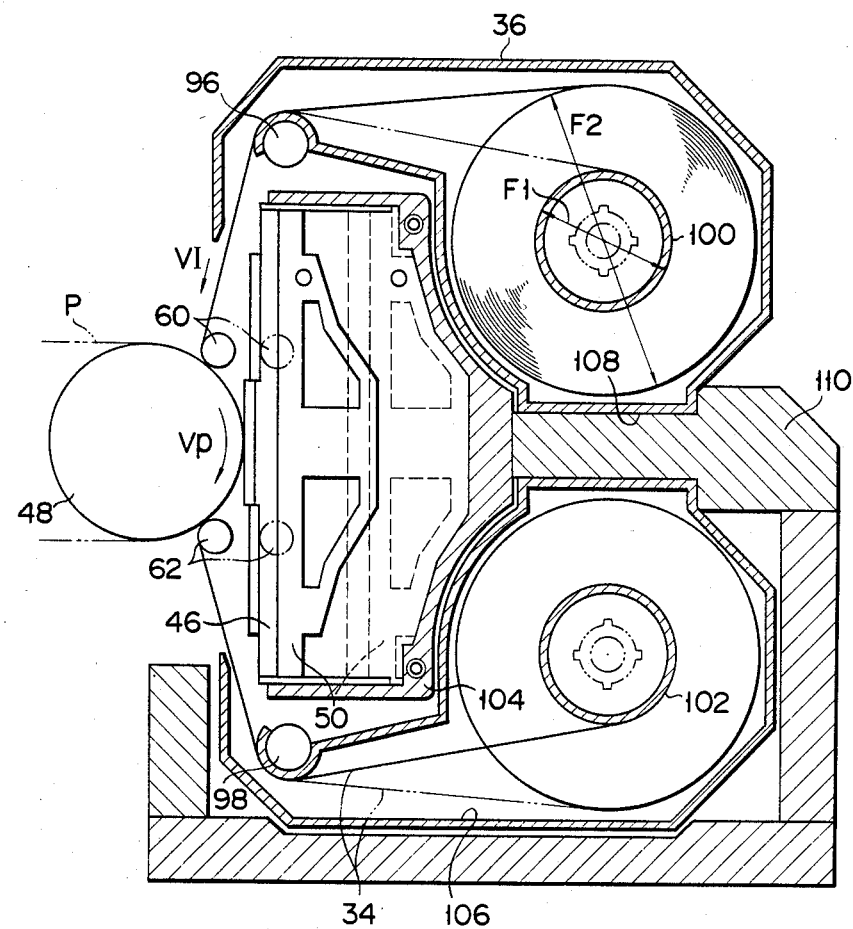
FIG. 13 is a schematic sectional view extractively showing a transfer unit of the thermal head printer shown in FIG. 5.

If the thicknesses of the ribbon 34 and the sheet P are ignored, the peripheral speed $V_p$ of the platen 48 and the ribbon conveying speed $V_I$, as shown in FIG. 13, are equal. The relation $V_P = V_I$ is generally established only if the ribbon 34 and the platen 48 (including the sheet P) are driven without a slip, pressed by the thermal head 46. If the intermediate ribbon roll diameter is F, the rotating speed N of the reel 100 is expressed as $N \propto V_I / \pi F$ ($N = V_I / \pi F$ where N, $V_I$ and F are given in pps, mm/s and mm, respectively), and is inversely proportional to F where $V_I$ is constant.

Figure 16:
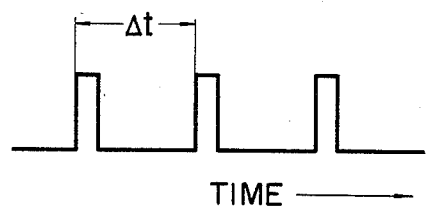
FIG. 16 shows an output signal of a rotating speed detector shown in FIG. 14.
Figure 17:
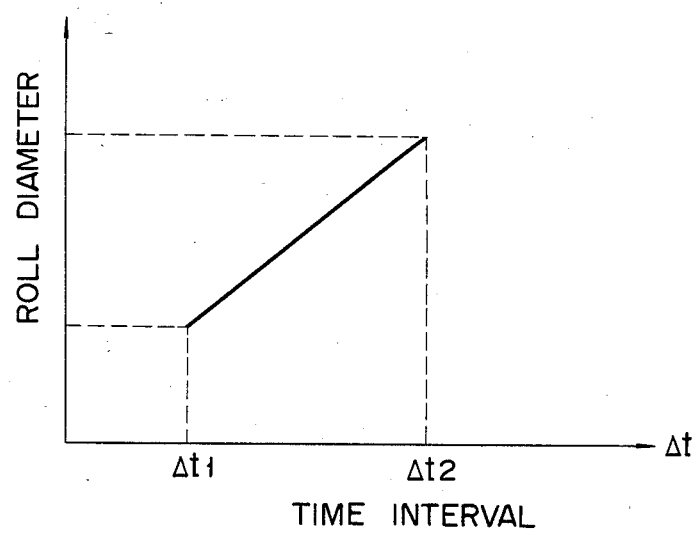
FIG. 17 is a diagram showing the relationship between time interval and the diameter of a ribbon roll.

If the time interval of the output signal of the detector 140 is $\Delta t$, as shown in FIG. 16, $\Delta t$ is expressed as $\Delta t \propto 1/N$.

Accordingly, there are relations $\Delta t \propto F$ ($F_1 \leq F \leq F_2$ where $F_1$ and $F_2$ are the minimum and maximum ribbon roll diameters, respectively) and $\Delta t = A \cdot F + B$ (where A and B are coefficients). Here the coefficients A and B are specific values which depend on the number of slits, the values $F_1$ and $F_2$, etc., and may be regarded as invariable (see FIG. 17). Thus, if the values A, B and $\Delta t$ are given, the ribbon roll diameter can be calculated according to the equation $F = (\Delta t - B)/A$.

According to the roll diameter detecting mechanism 134 of the aforementioned construction, the roll diameter of the ribbon 34 can readily be detected in an untouched manner, thereby delivering a detection signal. In this mechanism 134, moreover, the roll diameter (residual quantity) of the unused portion of the ribbon 34 in a cassette can be noticed with ease. The roll diameter detecting mechanism 134 is connected to the operation panel 32. Thus, the residual quantity of the unused ribbon portion is indicated on the display panel 30 of the operation panel 32 in response to the detection signal from the detecting mechanism 134.

Although the slitted disk 138 is used as the means for detecting the rotating speed of the roll shaft in the above embodiment, it may be replaced with a tachogenerator or other means to which the production of electric power is applied.

As shown in FIG. 18, the thermal head 46 and the holder 42 are slidably coupled to each other by a sliding mechanism 142. The sliding mechanism 142 is provided with two stays 144 and 146. A guide shaft 148 is fixed to both end portions of the one stay 144 and is supported by a bearing portion 150 protruding from the frame block 110 of the holder 42. A linear bearing (not shown) is buried in the bearing portion 150 to smooth the movement of the thermal head 46 in the direction of arrow M (see FIG. 18) relative to the frame block 110. Likewise, the other stay 146 is fitted with another guide shaft 152 and another bearing portion 154 with a linear bearing buried therein. The guide rollers (separating rollers) 60 and 62 are formed integrally with the thermal head 46 so as to be movable therewith. Therefore, when the thermal head 46 moves from the transfer position R toward a nontransfer position through a distance X, as shown in FIG. 19, the guide rollers 60 and 62 also move through the same distance X. In mounting the ribbon cassette 36, for example, the guide rollers 60 and 62 and the thermal head 46 can move for a gap $\delta$ from the platen 48. The gap $\delta$ facilitates the insertion of the ribbon 34 between the platen 48 and the thermal head 46.

Figure 20:
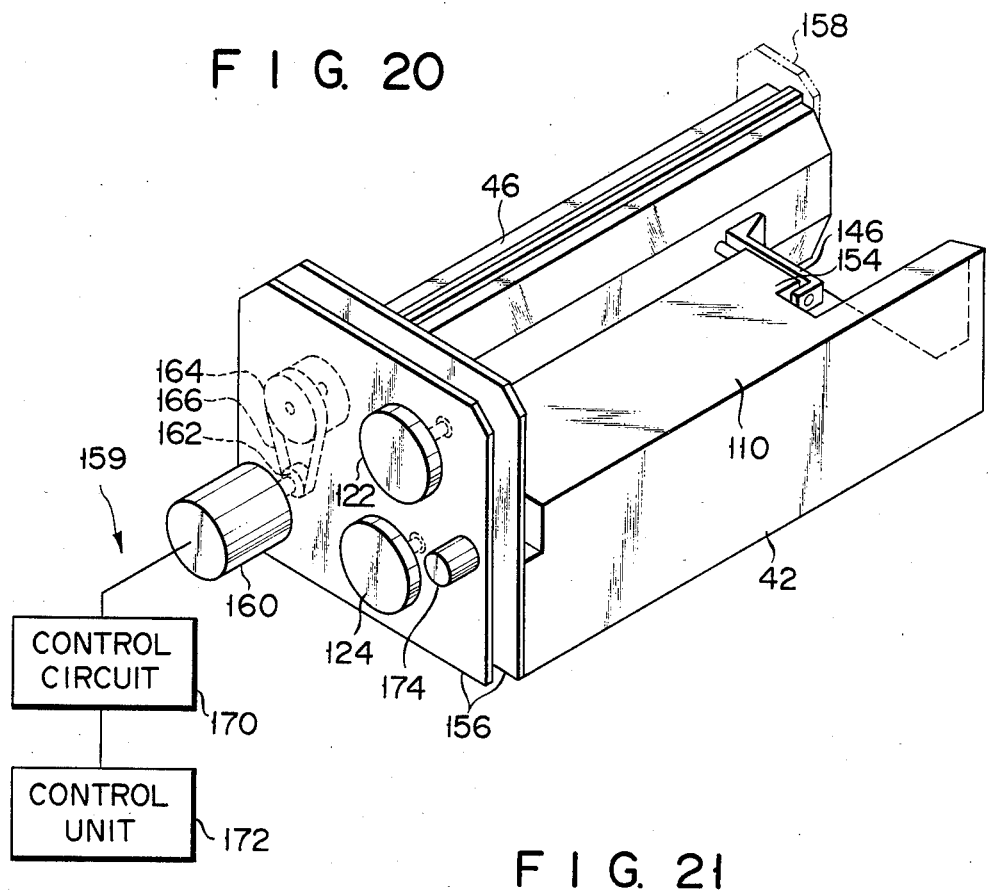
FIG. 20 is a perspective view showing the transfer unit of FIG. 18 and a drive mechanism therefor.
Figure 21:
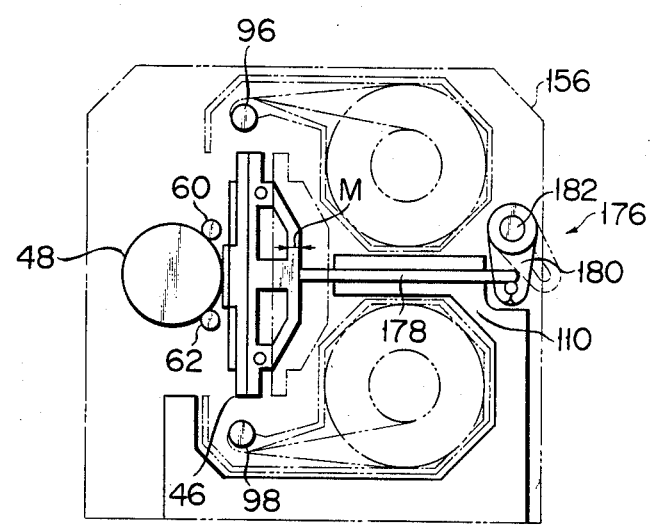
FIG. 21 is a schematic, side view showing a drive mechanism for a thermal head shown in FIG. 5.
Figure 22:
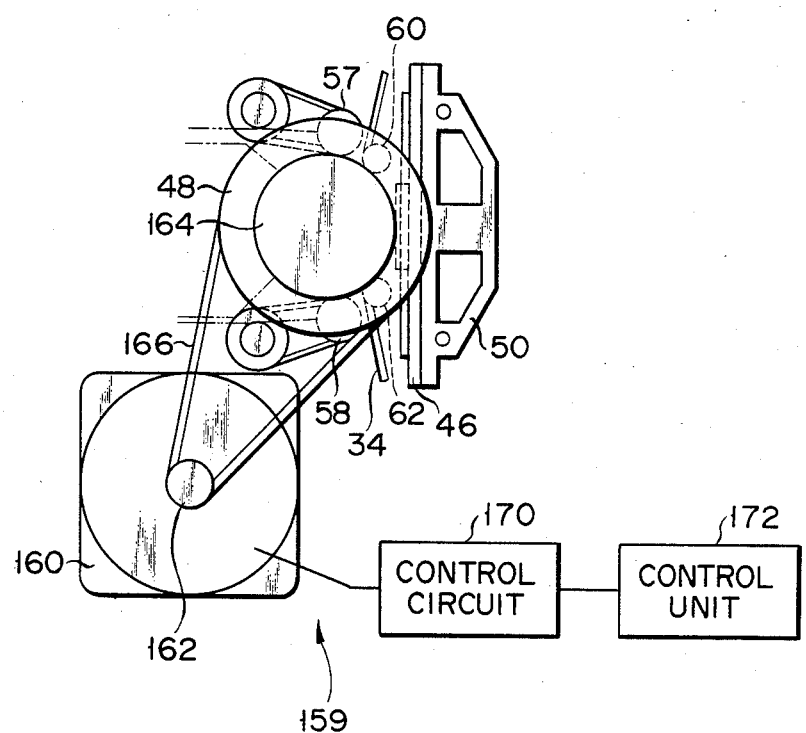
FIG. 22 illustrates the arrangement of a control mechanism for controlling the drive of a platen shown in FIG. 5.

As shown in FIGS. 20 and 21, both end portions of the platen 46 are rotatably supported on their corresponding end portions of the holder 42 by means of supporting plates 156 and 158, individually. The one supporting plate 156 includes two parallel plates. Disposed outside the supporting plate 156 or on the opposite side thereof to the holder 42 is a conveyance control mechanism (conveyance control means) 159 for controling conveyance of the sheet P between the thermal head 48 and the platen 46 for reciprocating in the transfer position (R). The conveyance control mechanism has a reversible motor 160 as a drive source for driving the platen. For example, a pulse motor is used for the motor 160. The drive shaft of the platen driving motor 160 is coupled to the platen 48 by means of a driving pulley 162, a driven pulley 164, and a belt 166 passed around the pulleys 162 and 164. The motor 160 is further connected to a control circuit 170 and a control unit 172 for controlling the drive of the motor 160. The control unit 172 feeds the control circuit 170 with control signals for controlling the operating conditions of the motor 160, such as stop, acceleration, deceleration, feed, etc. Based on the control signals from the control unit 172, the control circuit 170 delivers drive signals for driving the motor 160. For example, the control unit 172 controls the motor 160 so that the sheet P is conveyed in the reverse direction to have its trailing end portion separated from the ribbon 34 when the sheet P is advanced for a predetermined distance, and then the trailing end portion is held between the platen 48 and the pressure roller 58 for the transfer operation. The drive of the platen 48 controlled by the control circuit 170 and the control unit 172 will be described in detail later.

The supporting plate 156 is mounted with the ribbon driving motors 122 and 124 for feeding the ribbon 34 in the ribbon cassette 36 and a thermal head driving motor 174 for driving the thermal head 46, arranged beside the platen driving motor 160.

The thermal head driving motor 174 is coupled to a head shifting mechanism 176 shown in FIG. 21. In the head shifting mechanism 176, a coupling rod 178 with one end portion penetrating the frame block 110 and coupled to the back of the thermal head 46 is disposed so as to be slidable inside the frame block 110. The other end portion of the coupling rod 178 is coupled to one end portion of a rockable arm 180. A pivot 182 is fixed to the other end portion or pivotal center of the arm 180. The drive shaft of the thermal head driving motor 174 is coaxially coupled to one end portion of the pivot 182. With this arrangement of the head shifting mechanism 176, the thermal head 46 is moved in a straight line or in the direction indicated by arrow M.

Figure 23:
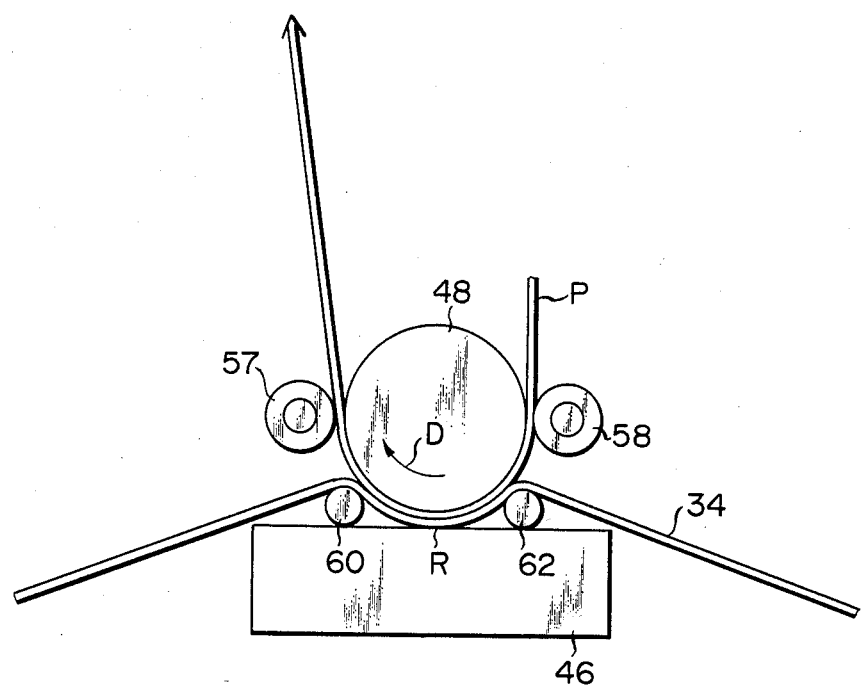
FIGS. 23 to 26 are operation diagrams for illustrating the transfer operation of the platen controlled by the control mechanism shown in FIG. 22.
Figure 24:
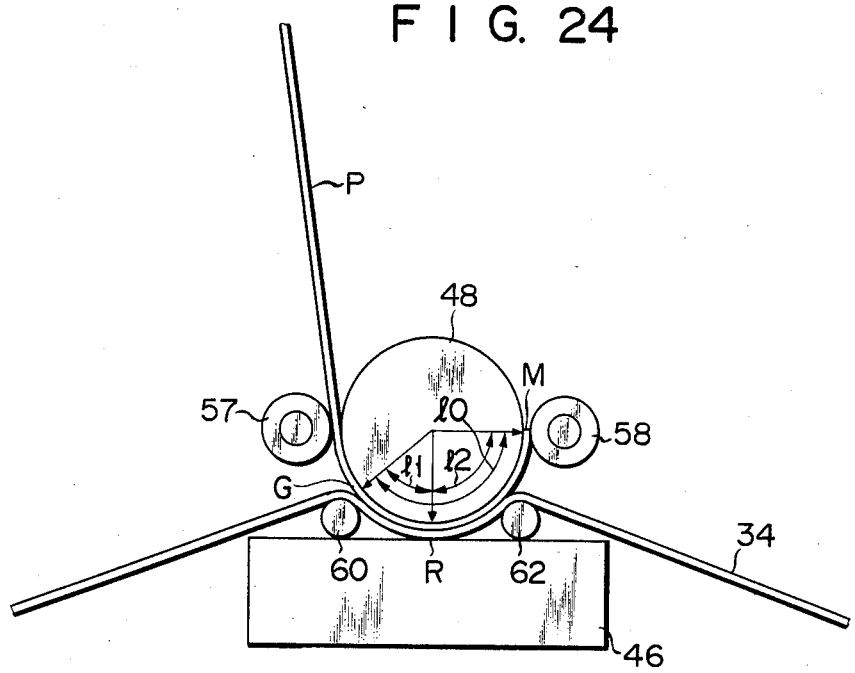
Figure 25:
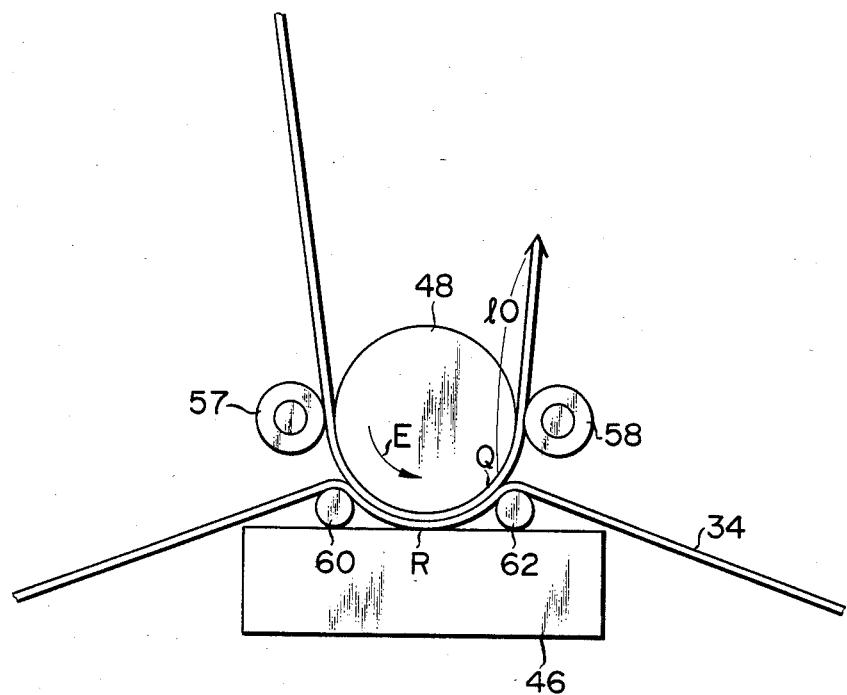

Referring now to FIGS. 23 to 25, there will be described the operation of the platen 48 driven by the conveyance control mechanism 159 which includes the platen driving motor 160 and its control unit 172, and the manner of separating the sheet P and the ribbon 34.

In a first transfer process (for the first-color transfer), as shown in FIG. 23, the sheet P, along with the ribbon 34, passes through the transfer position R as the platen 48 rotates. In the transfer position R, the ink portion of the ribbon 34 is melted and transferred from the ribbon 34 to the sheet P by the thermal head 46. Since the sheet P and the ribbon 34 in the transfer position R are in close contact with each other, they need to be separated after passing through the transfer position R.

The sheet P moves in one direction guided by the pressure roller 57 and the platen 48, while the ribbon 34 is guided in a direction substantially perpendicular to the sheet conveying direction by the guide roller (separating roller) 60. Thus, the sheet P and the ribbon 34 are conveyed in different directions, that is, separated, by the guide roller 60. As for the guide roller (separating roller) 62, it presses the ribbon 34 against the sheet P for close contact. In this case, the control unit 172 causes the control circuit 170 to rotate the platen driving motor 160 for a predetermined feed of the sheet P corresponding to the sheet size.

After the sheet P is conveyed for the predetermined feed by the platen 48, that is, after the platen driving motor 160 is rotated for a given frequency, the motor 160 ceases to rotate, as shown in FIG. 24. In this state, the trailing end portion of the sheet P is held between the platen 48 and the pressure roller 58. Namely, when the platen 48 is at a standstill, the color medium is transferred to a region of the sheet P ranging from its leading end to the portion corresponding to the transfer position R, so that the nontransfer region corresponds to angle $l_2$, as shown in FIG. 24. Although that portion of the sheet P which corresponds to angle $l_1$ of FIG. 24 is already subjected to the transfer process, it still is in close contact with the ribbon 34 located just short of the guide roller 60.

Subsequently, the platen 48 is rotated in the reverse direction (indicated by arrow E) to move back the sheet P, as shown in FIG. 25. The backward motion of the sheet P causes the guide roller 62 to separate the sheet P and the ribbon 34 in the same manner as the guide roller 60.

The feed of the sheet P, caused by the reverse rotation of the platen 48, is such that the portion O of the sheet P which corresponds to the guide roller 60 when the trailing end portion of the sheet P is held between the pressure roller 58 and the platen 48 passes by the guide roller 62. As a result, the region corresponding to angle $l_1$ (unseparated in the state of FIG. 24) is separated.

Figure 26:
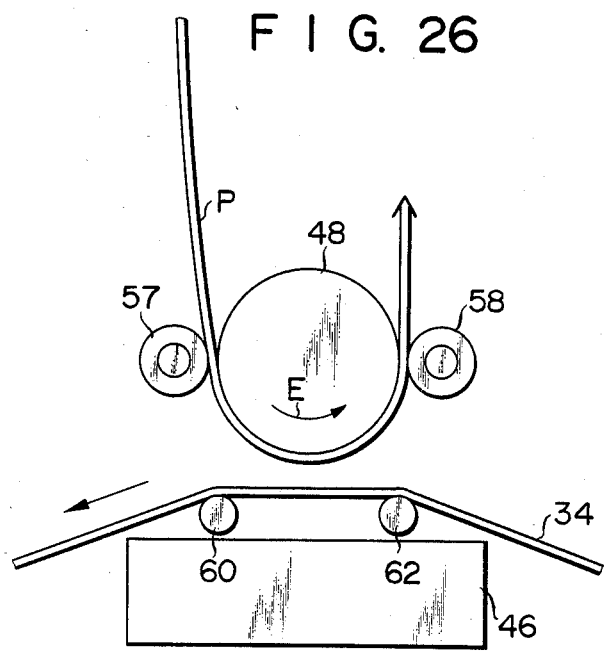

Then, after the rotation of the platen 48 is stopped, the thermal head 46, along with the ribbon 34, is separated from the platen 48 by the thermal head shifting mechanism, as shown in FIG. 26. Thereafter, the platen 48 is rotated again in the reverse direction (indicated by arrow E) until the leading end portion of the sheet P is held between the platen 48 and the pressure roller 57. At the same time, the ribbon 34 is set in position for a second-color transfer (second transfer process) so that the second color portion of the ribbon 34 is located in the transfer position R.

Second and third transfer processes are repeated in this manner. According to this embodiment, the nontransfer region at the trailing end portion of the sheet P corresponds to angle $l_2 = l_0 - l_1$. Thus, the nontransfer region of this embodiment is narrower than the conventional nontransfer region, which corresponds to angle $l_0$, by an area corresponding to angle $l_1$. In other words, the image forming region is increased by the area corresponding to angle $l_1$. For example, the conventional nontransfer region at the trailing end portion of the sheet P is about 50 mm in length. In this case, according to this embodiment, the length of the nontransfer region can be reduced by about 5 mm.

It is to be understood that the present invention is not limited by the embodiment described above, and that various changes and modifications may be made therein by one skilled in the art without departing from the scope or spirit of the invention.

In the above embodiment, the thermal head 46 and the holder 42 are slidably coupled by means of the sliding mechanism 142. As shown in FIGS. 27 to 29, however, an alternative sliding mechanism 186 may be used for this purpose. In the sliding mechanism 186, a guide case 188 is integrally formed on each end portion of a supporting portion which is fixed to the frame block 110. A bearing member 190 fixed to each end portion of the thermal head 46 is slidably fitted in the guide case 188. The bearing member 190 includes a plurality of bearings 192 which slide on the inside wall surface of the guide case 188. With this arrangement, the thermal head 46 can smoothly move between the transfer position and the nontransfer position (indicated by broken line in FIG. 27) as the coupling rod 178 moves in a straight line.

Figure 30:
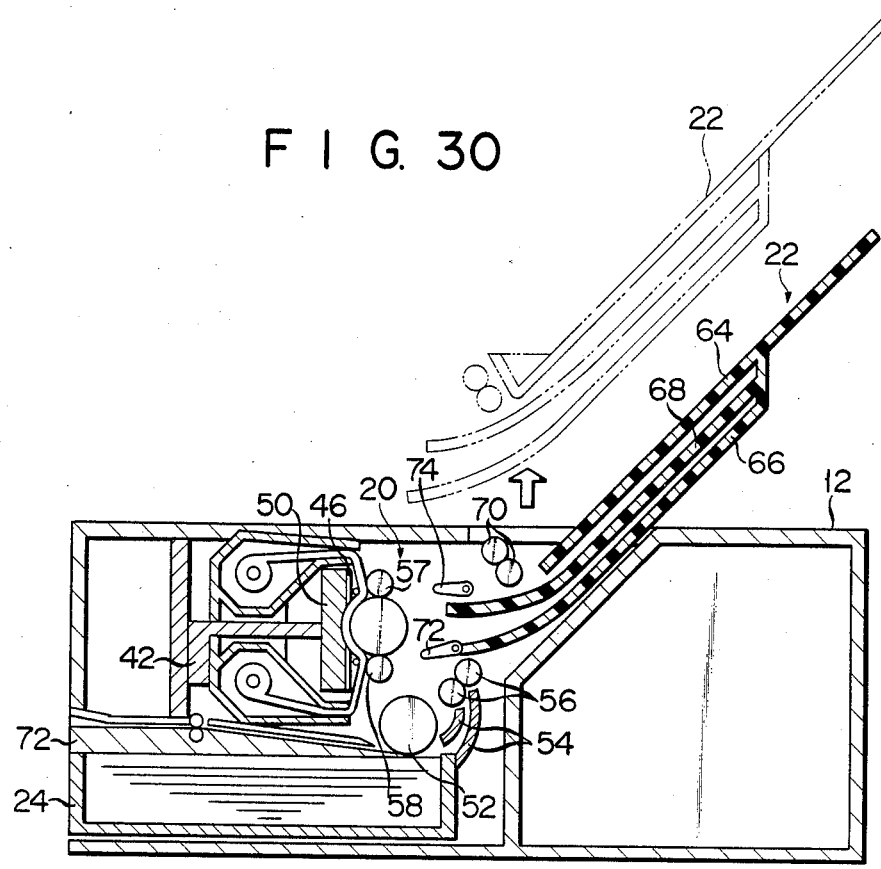
FIGS. 30 and 31 are schematic, sectional views showing thermal head printers according to alternative embodiments of the invention.
Figure 31:
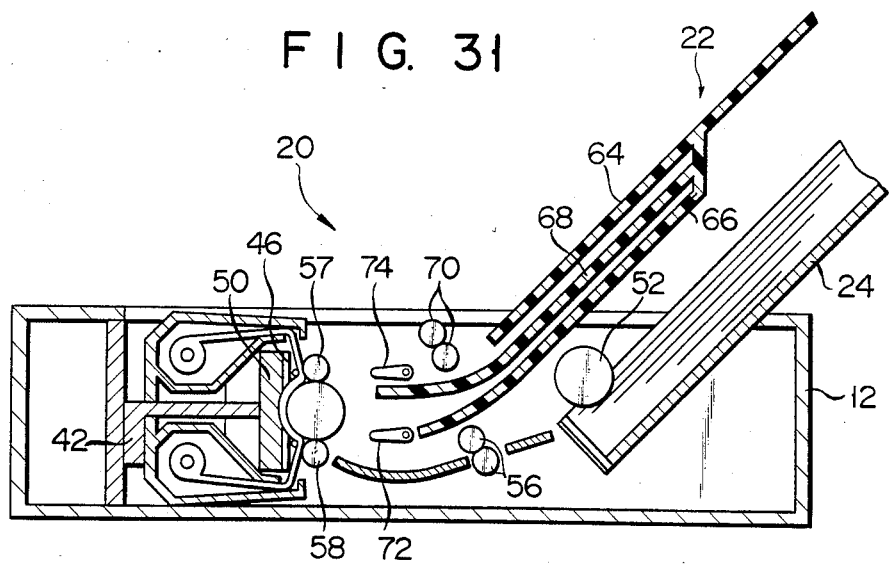

In the above described embodiment, moreover, the paper feed cassette 24 is attached and detached from the front side of the housing 12, partially projecting from the front of the housing 12. Alternatively, however, the copying apparatus 10 may be designed so that the paper feed cassette 24 is entirely received in the housing 12, as shown in FIG. 29. As shown in FIG. 30, moreover, the paper feed cassette 24 may be attached and detached from the top side of the housing 12. Furthermore, the manual feed guide 23 may be used in place of the paper feed cassette 24. Thus, the present invention may be applied to any image forming apparatus in which a desired image is formed by transferring a color medium from a transfer medium to an object of the transfer.

In the embodiment described above, a mechanism for rotating the platen is used for the sheet conveying means. Alternatively, however, the sheet may be conveyed by rotating the pressure rollers or by using a mechanism independent of the platen and pressure rollers.

In the above embodiment, moreover, a pulse motor is used for the conveying means so that the trailing end portion of the sheet is detected by measuring the feed of the sheet by the pulse motor. However, the tailing end portion may also be detected by means of, e.g., an optical detecting mechanism.

What is claimed is:

1. An image forming apparatus for forming an image on a sheet by transferring a color medium from a transfer medium to the sheet over the full length thereof in a transfer position in accordance with an image pattern comprising:
   a recording head for transferring the color medium from the transfer medium to the sheet in accordance with the image pattern;
   a platen opposed to the recording head and supporting the sheet in the transfer position;
   a pair of pressure means for pressing the sheet against the platen on either side of the transfer position, thereby holding the sheet in conjunction with the platen;
   a pair of separating means located individually between the transfer position and the pair of pressure means and adapted to separate the transfer medium from the sheet; and
   conveyance control means for controlling conveyance of the sheet between the recording head and the platen for reciprocation in the transfer position, said conveyance control means being adapted to convey the sheet, with the leading end portion thereof forward, in the forward direction through the transfer position at the time of transfer, so that the transfer medium is separated by one separating means from the sheet with the color medium transferred thereto from the transfer medium in the transfer position, and to convey the sheet in the backward direction after the color medium is transferred to the trailing end portion of the sheet, so that the transfer medium is separated from the transfer-printed trailing end portion of the sheet by the other separating means.

2. An apparatus according to claim 1, wherein said conveyance control means is provided with a control unit adapted to detect the trailing end portion of the sheet by sensing the feed of the sheet and to convey the sheet in the backward direction after the color medium is transferred to the trailing end portion of the sheet.

3. An apparatus according to claim 2, wherein said conveyance control means is provided with a pulse motor driven in response to pulse signals delivered from the control unit to convey the sheet, and said control unit detects the feed of the sheet by counting the pulse signals.

4. An apparatus according to claim 1, wherein said conveyance control means is coupled to the platen and conveys the sheet by rotating the platen.

5. An apparatus according to claim 1, wherein said recording head is provided with a head shifting mechanism for moving the recording head away from the platen so that the transfer medium is removed from the sheet after the transfer-printed trailing end portion of the sheet is separated by the other separating means.

6. An apparatus according to claim 1, wherein said separating means include a pair of guide rollers adapted to guide the transfer medium to the transfer position and to bring the transfer medium closely into contact with the sheet at the time of transfer, whereby the transfer medium is separated from the transfer-printed trailing end portion of the sheet when the sheet is conveyed in the other direction by the conveying means.

7. An apparatus according to claim 6, wherein said pair of guide rollers are formed integrally with the recording head so that the guide rollers are removed along with the recording head from the platen by the head shifting mechanism after the transfer medium is separated from the transfer-printed trailing end portion of the sheet by the conveyance control means.

8. An apparatus according to claim 1, wherein said transfer medium is provided with a cassette including a reel wound with the transfer medium, said apparatus further comprising a detecting mechanism for detecting the residual quantity of the transfer mechanism wound on the reel.

9. An apparatus according to claim 8, wherein said detecting mechanism includes a detector for detecting the rotating speed of the reel rotated when the transfer medium travels.

10. An apparatus according to claim 9, wherein said reel is coupled with a disk having a plurality of slits therein, and said detector detects the residual quantity of the transfer medium wound on the reel by optically sensing the passage of the slits in the disk.

11. An apparatus according to claim 10, which further comprises a display panel for indicating the residual quantity of the transfer medium in accordance with a signal from the detector.

* * * * *